(12) United States Patent
Takeuchi et al.

(10) Patent No.: US 11,333,674 B2
(45) Date of Patent: May 17, 2022

(54) TEST KIT, LIQUID DELIVERY METHOD AND TESTING APPARATUS USING TEST KIT

(71) Applicant: OTSUKA PHARMACEUTICAL CO., LTD., Tokyo (JP)

(72) Inventors: Mami Takeuchi, Tokyo (JP); Masataka Matsuo, Tokyo (JP)

(73) Assignee: OTSUKA PHARMACEUTICAL CO., LTD., Tokyo (JP)

(*) Notice: Subject to any disclaimer, the term of this patent is extended or adjusted under 35 U.S.C. 154(b) by 384 days.

(21) Appl. No.: 15/775,278

(22) PCT Filed: Nov. 7, 2016

(86) PCT No.: PCT/JP2016/082958
§ 371 (c)(1),
(2) Date: May 10, 2018

(87) PCT Pub. No.: WO2017/086199
PCT Pub. Date: May 26, 2017

(65) Prior Publication Data
US 2018/0372767 A1    Dec. 27, 2018

(30) Foreign Application Priority Data
Nov. 16, 2015 (JP) .............................. JP2015-224215

(51) Int. Cl.
*G01N 35/10* (2006.01)
*B01L 3/02* (2006.01)
(Continued)

(52) U.S. Cl.
CPC ........ *G01N 35/1002* (2013.01); *B01L 3/0275* (2013.01); *B01L 3/5027* (2013.01);
(Continued)

(58) Field of Classification Search
CPC .......... G01N 35/1002; G01N 21/6428; G01N 35/08; G01N 35/10; G01N 35/1079;
(Continued)

(56) References Cited

U.S. PATENT DOCUMENTS 4,917,274 A    4/1990   Asa et al.
4,971,763 A   11/1990   Columbus
(Continued)

FOREIGN PATENT DOCUMENTS

EP    2672273       12/2013
JP    S 53-057894 U   5/1978
(Continued)

OTHER PUBLICATIONS

Office Action dated Dec. 25, 2019 issued in Japanese Patent Application No. 2017-551821.
(Continued)

*Primary Examiner* — Benjamin R Whatley
*Assistant Examiner* — Jacqueline Brazin
(74) *Attorney, Agent, or Firm* — Sughrue Mion, PLLC (57) ABSTRACT

A test kit of the present invention includes an analysis chip and a pipette tip. The pipette tip includes: a first portion coming in contact with an insertion hole hermetic seal when the pipette tip is inserted into a pipette tip insertion portion so as to allow a liquid dispensation port to be positioned at or in the vicinity of a bottom surface of the pipette tip insertion portion; and a second portion positioned closer to the liquid dispensation port side than the first portion. The outer diameter of the second portion is formed to be equal to or greater than the outer diameter of the first portion and any portion between the first portion and the second portion.

7 Claims, 9 Drawing Sheets

(51) Int. Cl.
    *G01N 35/08*     (2006.01)
    *B01L 3/00*     (2006.01)
    *G01N 21/64*     (2006.01)

(52) U.S. Cl.
    CPC ....... *B01L 3/502715* (2013.01); *G01N 21/648* (2013.01); *G01N 21/6428* (2013.01); *G01N 35/08* (2013.01); *G01N 35/10* (2013.01); *B01L 2200/025* (2013.01); *B01L 2200/027* (2013.01); *B01L 2200/0605* (2013.01); *B01L 2200/0689* (2013.01); *B01L 2300/0663* (2013.01); *B01L 2300/0832* (2013.01); *G01N 35/1079* (2013.01); *G01N 2021/6439* (2013.01)

(58) Field of Classification Search
    CPC .................. B01L 3/0275; B01L 3/5027; B01L 3/502715; B01L 2200/025; B01L 2200/027; B01L 2200/0605; B01L 2200/0689; B01L 2300/0663; B01L 2300/0832
    USPC ......................................................... 422/430
    See application file for complete search history.

(56) References Cited

U.S. PATENT DOCUMENTS

| | | | |
|---|---|---|---|
| 6,135,172 A | 10/2000 | Fere et al. | |
| 6,273,478 B1 | 8/2001 | Benett et al. | |
| 2003/0157503 A1* | 8/2003 | McGarry | B01L 3/502723 |
| | | | 435/6.11 |
| 2004/0017078 A1 | 1/2004 | Karp et al. | |
| 2006/0228263 A1* | 10/2006 | Berndtsson | B01L 3/502715 |
| | | | 422/514 |
| 2009/0202392 A1* | 8/2009 | Urano | B01L 3/0275 |
| | | | 422/400 |
| 2011/0124111 A1 | 5/2011 | Hoshizaki et al. | |
| 2014/0080226 A1 | 3/2014 | Cauley, III et al. | |
| 2015/0153371 A1 | 6/2015 | Morita et al. | |

FOREIGN PATENT DOCUMENTS

| | | | | |
|---|---|---|---|---|
| JP | 10-132713 | | 5/1998 | |
| JP | 2011-523698 | | 8/2011 | |
| JP | 2013-156205 | | 8/2013 | |
| JP | 2013-160648 | | 8/2013 | |
| JP | 2013-185967 | | 9/2013 | |
| JP | 2013-242247 | | 12/2013 | |
| JP | 2014-506858 | | 3/2014 | |
| JP | 2015-064214 | | 4/2015 | |
| JP | 6372985 | * | 4/2015 | |
| JP | 2015064214 | * | 4/2015 | |
| JP | 2015-518571 | | 7/2015 | |
| WO | WO 2006/097749 | | 9/2006 | |
| WO | WO 2012/105171 | | 8/2012 | |
| WO | WO 2012/160923 | | 11/2012 | |
| WO | WO-2012160923 A1 | * | 11/2012 | ......... G01N 35/1095 |

OTHER PUBLICATIONS

Search Report and Written Opinion dated Jan. 31, 2017 issued in the corresponding International Patent Application No. PCT/JP2016/082958.

Extended Search Report dated Oct. 17, 2018 issued in European Patent Application No. 16866201.3.

Office Action dated Mar. 16, 2020 issued in Japanese Patent Application No. 2017-551821.

* cited by examiner

TEST KIT, LIQUID DELIVERY METHOD AND TESTING APPARATUS USING TEST KIT

RELATED APPLICATIONS

This is a U.S. National Phase Application under 35 USC 371 of International Application PCT/JP2016/082958 filed on Nov. 7, 2016.

This application claims the priority of Japanese application no. 2015-224215 filed Nov. 16, 2015, the entire content of which is hereby incorporated by reference.

TECHNICAL FIELD

The present invention relates to a test kit used in a biochemical testing apparatus.

BACKGROUND ART

Biochemical tests include the use of biochemical reactions such as an antigen-antibody reaction. These biochemical reactions are performed using an analysis chip or the like. The analysis chip includes a microchannel, inside which an antigen capture membrane as a reaction field of a biochemical reaction is fixed. In advancing the reaction, a liquid sample containing the target antigen is supplied to the microchannel through one opening of the microchannel. A solid phase antibody to capture the target antigen is immobilized on the antigen capture membrane, and thus, filling the microchannel with the liquid sample brings the liquid sample into contact with the antigen capture membrane, allowing the target antigen to bind to the solid phase antibody to be captured. After a sufficient time has elapsed for the reaction, the liquid sample is collected from the microchannel, and then, the fluorescent labeling liquid is supplied to the microchannel. The microchannel is filled with the fluorescent labeling liquid to bring the fluorescent labeling liquid into contact with the antigen capture membrane, causing the target antigen captured by the antigen capture membrane to bind to the fluorescent labeling antibody contained in the fluorescent labeling liquid to be fluorescent-labeled. After a sufficient time for the reaction has elapsed, the fluorescent labeling liquid is collected from the microchannel to finish the reaction. Thereafter, the presence or absence, the amount of binding, or the like, of the target antigen to the solid phase antibody that captures the target antigen is determined by surface plasmon resonance (SPR), surface plasmon-field resonance enhanced fluorescence spectroscopy (SPFS), or the like.

In the biochemical test described above, the liquid sample and the fluorescent labeling liquid are supplied from a pipette tip to the microchannel or collected from the microchannel by dispensation or aspiration by a pump. Moreover, there are cases where the channel interior is washed by a washing liquid supplied to the microchannel before the reaction starts or after the individual liquids are collected. In this case, the washing liquid is also supplied to or collected from the microchannel by dispensation or aspiration by the pump via the pipette tip.

CITATION LIST

Patent Literature

Patent Literature 1: JP 2013-185967 A

SUMMARY OF INVENTION

Technical Problem

In the biochemical testing apparatus using the above-described analysis chip, liquids needed for reaction or measurement such as a liquid sample, a fluorescent labeling liquid, and a measurement liquid are supplied to the microchannel from the pipette tip in mutually different steps, and collected after a lapse of certain period of time. At the time of liquid delivery, a pipette tip is inserted into a pipette tip insertion portion 3101 illustrated in FIG. 2, and the liquid is dispensed into the pipette tip insertion portion 3101. At this time, since there is a resistance due to the microchannel, it would be difficult to allow the liquid to enter the microchannel and difficult to perform appropriate liquid delivery without application of pressure to the pipette tip insertion portion 3101. Therefore, in Patent Literature 1, an insertion hole hermetic seal 3111 is attached to the opening of the pipette tip insertion portion 3101, and the pipette tip is inserted into the pipette tip insertion portion 3101 through the insertion hole hermetic seal 3111 at the liquid delivery, and the pipette tip insertion portion 3101 is hermetically sealed by bringing the pipette tip into close contact with the insertion hole hermetic seal 3111. Thereby, when liquid is dispensed from the pipette tip, the air in the pipette tip insertion portion 3101 is compressed to increase the air pressure in the pipette tip insertion portion 3101, making it possible to deliver the liquid to the microchannel. Similarly, when liquid is aspirated, the air in the pipette tip insertion portion 3101 expands to decrease the air pressure in the pipette tip insertion portion 3101, so as to allow the liquid to return from the microchannel.

Figure 6A:
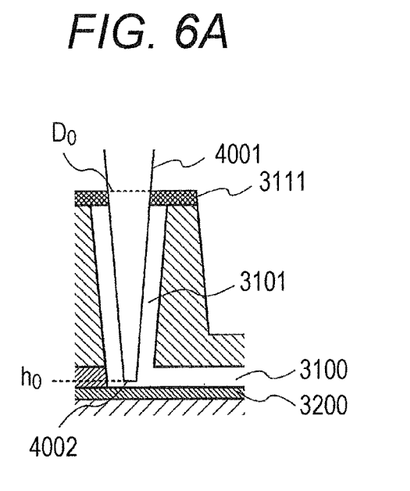
FIGS. 6A and 6B are explanatory diagrams for illustrating operation of a conical end-type pipette tip.
Figure 6B:
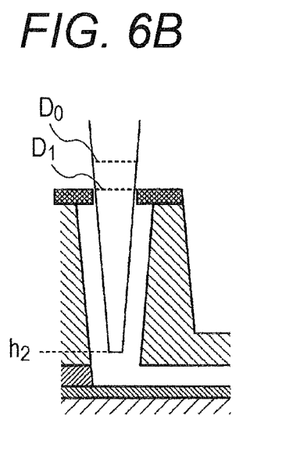

Furthermore, in order to grasp the positional relationship between the pipette tip and the analysis chip when the pipette tip is inserted into the pipette tip insertion portion 3101, there is a need to manage the vertical position of the pipette tip. In particular, the distance between the liquid dispensation port of the pipette tip and a conductor film (gold film) to be a bottom surface of the microchannel greatly influences the residual liquid amount in the channel after the liquid collection, and greatly affects the measurement result. Therefore, in order to control the distance between the liquid dispensation port of the pipette tip and the conductor film with high accuracy, it is preferable to perform end detection of detecting a position of the pipette tip (hereinafter also referred to as an end detection position h0) when the distance between the liquid dispensation port of the pipette tip and the conductor film is minimized, and to perform adjustment of the vertical position of the pipette tip with reference to the detected end detection position h0. In this case, as illustrated in FIG. 6A, a liquid dispensation port 4002 of the pipette tip is inserted into the end detection position h0 on the surface of or in the vicinity of the conductor film 3200. Thereafter, when the liquid is delivered, a pipette tip 4001 is moved to a sealed position h2 where the liquid dispensation port 4002 is separated from the surface of the conductor film 3200 and the pipette tip 4001 and the insertion hole hermetic seal 3111 are in close contact with each other. In a case, however, where a conical end-type pipette tip having an end formed in a conical shape as illustrated is used, an outer diameter D0 of the pipette tip 4001 at a position of the insertion hole hermetic seal when arranged at the end detection position h0 is larger than an outer diameter D1 at the position of the insertion hole hermetic seal when arranged at the sealed position h2, as illustrated in FIG. 6B. This end detection causes the diameter of the hole of the insertion hole hermetic seal 3111 through which the pipette tip 4001 has penetrated to be increased to the diameter D0. Accordingly, it is difficult, with an outer diameter D1 (smaller than diameter D0) at the position of the insertion hole hermetic seal of the pipette tip 4001 arranged at the sealed position h2, to close the hole of the insertion hole hermetic seal 3111 through which the pipette tip 4001 has penetrated, making it difficult to close the hole of the insertion hole hermetic seal 3111. This leads to difficulty in hermetically sealing the pipette tip insertion portion 3101 and difficulty in sufficiently supplying the liquid to the microchannel 3100.

Note that the diameter of the hole of the insertion hole hermetic seal 3111 does not necessarily stay at the diameter D0 penetrated by the pipette tip at the end detection when the liquid dispensation port 4002 of the pipette tip is arranged at the sealed position h2 (hereinafter, at the time of liquid delivery after the end detection) depending on the material characteristics of an elastic sheet described below used for the insertion hole hermetic seal 3111. For example, with the use of a selected material that shrinks to reduce the diameter of the hole of the insertion hole hermetic seal 3111 to be smaller than the outer diameter D1 at the position of the insertion hole hermetic seal of the pipette tip 4001 at the time of liquid delivery after the end detection, it would be possible to solve the problem of insufficient sealability at the time of liquid delivery. In a case, however, where the diameter of the hole of the insertion hole hermetic seal 3111 is increased to be larger than the outer diameter D1 at the time of liquid delivery after the end detection, the problem of insufficient sealability arises even with the diameter not having been increased to the diameter D0.

Figure 8A:
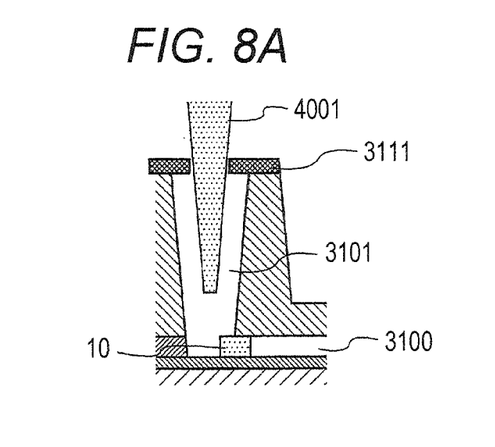
FIGS. 8A to 8C are explanatory diagrams for illustrating a mechanism related to bubble formation.
Figure 8B:
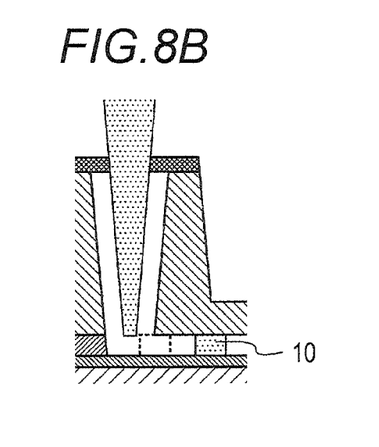
Figure 8C:
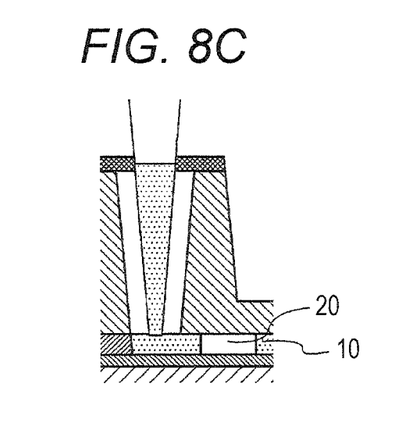

In addition, while the liquid is supplied to the microchannel and is collected after a certain period of time, it is difficult to completely collect the liquid from the microchannel. For example, Patent Literature 1 discloses a biochemical testing apparatus that inserts, at the time of liquid collection, a nozzle into an insertion hole of a test chip (hereinafter also referred to as an analysis chip) deeper than the depth at the liquid delivery so as to collect the liquid as completely as possible from the microchannel. There is a case, however, a minute amount of liquid remains in the channel even with the use of the biochemical testing apparatus of Patent Literature 1. When the pipette tip 4001 is inserted into the pipette tip insertion portion 3101 (refer to FIG. 8A) for liquid delivery in the next step with the presence of the residual liquid 10 of the preceding step in the microchannel 3100, the opening of the pipette tip insertion portion 3101 is hermetically sealed as illustrated in FIG. 8B after the pipette tip 4001 is brought into close contact with the insertion hole hermetic seal 3111. When the pipette tip 4001 is further lowered or the liquid is dispensed in this state, pressure would be applied to the inside of the pipette tip insertion portion 3101 and would cause the residual liquid 10 in the previous step to be pushed out to the downstream side of the microchannel 3100. When the next step liquid is kept dispensing at this state as illustrated in FIG. 8C, a bubble 20 is sandwiched between the dispensed next step liquid and the residual liquid 10 of the preceding step and moves toward the downstream side of the microchannel 3100. When the bubble 20 stays at a certain position of the antigen capture membrane in the microchannel, steps such as progress of antigen-antibody reaction and detection of surface plasmon excitation fluorescence are hindered, leading to a failure in precise measurement.

Solution to Problem

In order to achieve sealability at the time of liquid delivery as described above, a test kit according to the present invention is a test kit including an analysis chip and a pipette tip, in which the analysis chip includes a pipette tip insertion portion hermetically sealed by a hermetic seal and includes a microchannel connected at a bottom surface of the pipette tip insertion portion, an end portion to be inserted into the pipette tip insertion portion of the pipette tip includes: a first portion coming in contact with the hermetic seal when being inserted into the pipette tip insertion portion so as to allow a liquid dispensation port to be positioned at or in the vicinity of the bottom surface of the pipette tip insertion portion; and a second portion positioned closer to the liquid dispensation port side than the first portion, and an outer diameter of the second portion is formed to be equal to or larger than an outer diameter of the first portion and any portion between the first portion and the second portion.

Moreover, in order to solve the bubble formation problem while achieving the sealability at the time of liquid delivery, a liquid delivery method according to the present invention is a liquid delivery method using a test kit including:

an analysis chip having a pipette tip insertion portion sealed by a hermetic seal and having a microchannel connected at a bottom surface of the pipette tip insertion portion; and a pipette tip having a first portion coming in contact with the hermetic seal when the pipette tip is inserted into the pipette tip insertion portion to allow a liquid dispensation port of the pipette tip to be positioned at or in the vicinity of the bottom surface of the pipette tip insertion portion, a second portion positioned closer to the liquid dispensation port side than the first portion, and a third portion having an outer diameter smaller than an outer diameter of the first portion, in which an outer diameter of the second portion is formed to be equal to or larger than the outer diameter of the first portion and any portion between the first portion and the second portion, the liquid delivery method including:

a first step of supplying a first liquid into the microchannel; a second step of collecting the first liquid supplied into the microchannel from inside the microchannel; a third step of dispensing a first amount of a second liquid into the pipette tip insertion portion in a state where the third portion of the pipette tip is arranged at a position of the hermetic seal; and a fourth step of arranging the second portion of the pipette tip so as to be in close contact with the hermetic seal after dispensing the first amount of the second liquid, and then dispensing a second amount of the second liquid into the pipette tip insertion portion to supply the second liquid into the microchannel.

Moreover, in order to solve the bubble formation problem while achieving the sealability at the time of liquid delivery, a test kit is removably installable on a testing apparatus according to the present invention, the test kit including:

an analysis chip having a pipette tip insertion portion sealed by a hermetic seal and having a microchannel connected at a bottom surface of the pipette tip insertion portion; and a pipette tip having a first portion coming in contact with the hermetic seal when the pipette tip is inserted into the pipette tip insertion portion to allow a liquid dispensation port of the pipette tip to be positioned at or in the vicinity of the bottom surface of the pipette tip insertion portion; a second portion positioned closer to the liquid dispensation port side than the first portion; and a third portion having an outer diameter smaller than an outer diameter of the first portion, in which an outer diameter of the second portion is formed to be equal to or larger than the outer diameter of the first portion and any portion between the first portion and the second portion, the testing apparatus including:

a liquid delivery section being a liquid delivery means of supplying a liquid from the pipette tip inserted into the pipette tip insertion portion into the microchannel, the liquid delivery means being configured to supply a first liquid into the microchannel, collect the first liquid supplied into the microchannel from inside the microchannel and thereafter dispense a first amount of a second liquid into the pipette tip insertion portion in a state where the third portion of the pipette tip is arranged at a position of the hermetic seal, arrange the second portion of the pipette tip so as to be in close contact with the hermetic seal after dispensing the first amount of the second liquid, and then dispense a second amount of the second liquid into the pipette tip insertion portion to supply the second liquid into the microchannel; and a detector configured to detect a reaction result of a reaction field fixed inside the microchannel.

Advantageous Effects of Invention

According to the present invention, the shape of the pipette tip used in the biochemical testing apparatus is designed in accordance with the dimensions of the analysis chip. With the use of the pipette tip, even when the hole of the insertion hole hermetic seal is increased by end detection of the pipette tip, it is possible to close the hole of the hermetic seal with the outer diameter at the position of the insertion hole hermetic seal of the pipette tip when arranged at the sealed position, enabling achievement of the pressure needed for liquid delivery. This makes it possible to reliably deliver liquids into the microchannel.

DESCRIPTION OF EMBODIMENTS

Hereinafter, an embodiment of the present invention will be described in detail with reference to the drawings. The present embodiment relates to a test kit to be used in a biochemical testing apparatus that detects binding of a target antigen by surface plasmon-field resonance enhanced fluorescence spectroscopy (SPFS).

(Outline of Biochemical Testing Apparatus)

Figure 1:
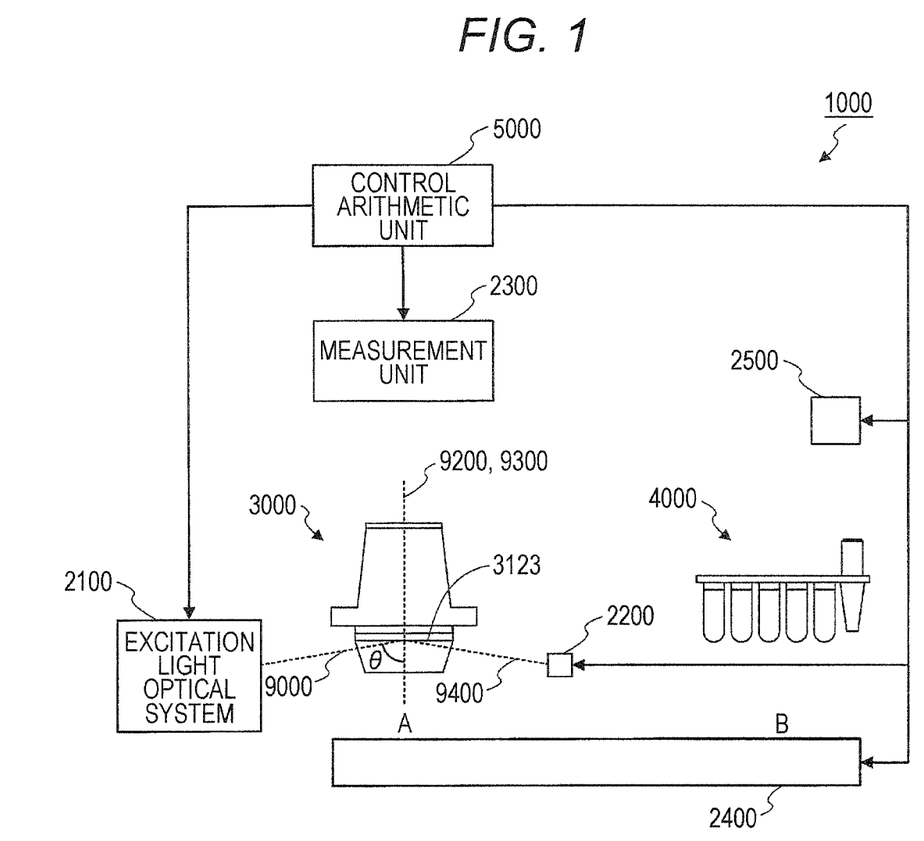
FIG. 1 is a schematic diagram illustrating a configuration of a biochemical testing apparatus.

FIG. 1 is a schematic diagram illustrating a configuration of a biochemical testing apparatus.

As illustrated in FIG. 1, a biochemical testing apparatus 1000 includes an excitation light optical system 2100, a measurement unit 2300, a photodiode 2200, a conveyance mechanism 2400, a pump unit 2500, an analysis chip 3000, a reagent chip 4000, and a control arithmetic unit 5000.

The excitation light optical system 2100 includes a laser diode as a light source and emits excitation light 9000 so as to set an incident angle on a reflection surface 3123 of the analysis chip 3000 to an angle θ.

The measurement unit 2300 includes a photomultiplier tube as a light receiving element and is arranged on an optical path of surface plasmon excitation fluorescence 9200 and measures light amounts of the surface plasmon excitation fluorescence 9200 and scattered light 9300. The light amount of the surface plasmon excitation fluorescence 9200 is used to determine the presence or absence of binding of the target antigen or the amount of binding of the target antigen. The light amount of the scattered light 9300 is used for detecting an incident angle θ of the excitation light. In this case, the angle θ as the incident angle that maximizes the light amount of the scattered light 9300 is detected as an enhancement angle θr. Alternatively, however, the incident angle θ of the excitation light may be detected using the following photodiode 2200 as described below. In that case, there is no need to detect the enhancement angle θr using the light amount of the scattered light 9300.

The photodiode 2200 is arranged on the optical path of reflected light 9400 of the excitation light 9000 to measure the light amount of the reflected light 9400. In this case, the resonance angle that minimizes the light amount of the reflected light 9400 is detected, so as to be used for specifying the incident angle θ of the excitation light. When the incident angle θ of the excitation light is not to be specified by the light amount of the reflected light 9400, the photodiode 2200 may be omitted and replaced by a light absorber or the like.

The analysis chip 3000 is attached to the conveyance mechanism 2400. The conveyance mechanism 2400 allows the analysis chip 3000 to reciprocate between a reaction position B during the progress of reaction and a measurement position A on a measurement optical path. The pump unit 2500 includes a moving mechanism for moving the pipette tip to a predetermined position, a liquid delivery mechanism for dispensing or aspirating air or a liquid via a pipette tip, and a pressure sensor that detect an air pressure in the pipette tip. The reagent chip 4000 includes liquid containers that contain individual liquids used in biochemical reactions.

The control arithmetic unit 5000 includes a control arithmetic block group that controls operation of each of the above-described components.

(Analysis Chip)

Figure 2:
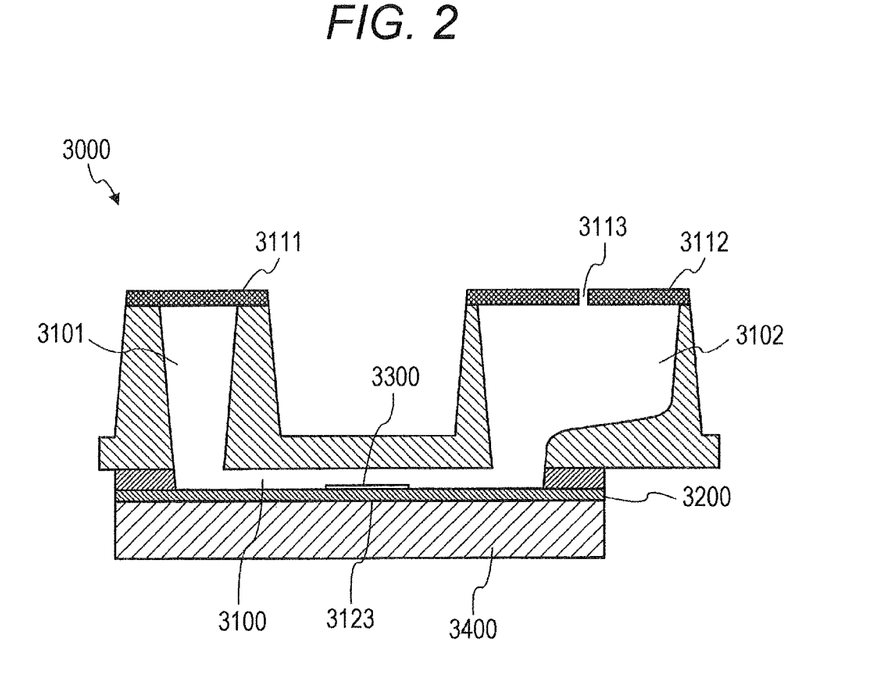
FIG. 2 is a cross-sectional view of an analysis chip.

FIG. 2 is a cross-sectional view of the analysis chip 3000.

As illustrated in FIG. 2, the microchannel 3100 is formed in the analysis chip 3000. One end of the microchannel 3100 is connected to the pipette tip insertion portion 3101 to which the pipette tip is inserted, while the other end is connected to a stirring tank 3102 to stir the liquid in reciprocating the liquid in the channel. An insertion hole hermetic seal 3111 and a stirring tank seal 3112 are respectively attached to openings of the pipette tip insertion portion 3101 and the stirring tank 3102, not connected to the microchannel 3100. The stirring tank seal 3112 includes a vent 3113.

Although not illustrated, the insertion hole hermetic seal 3111 is formed of a double layer of an elastic sheet and an adhesive sheet, and is formed to allow the elastic sheet to be joined to the periphery of the opening not connected to the microchannel 3100 of the pipette tip insertion portion 3101, via the adhesive sheet. It is preferable that the elastic sheet is a film formed of polyurethane and has a tensile elastic constant of 0.05 GPa to 2 GPa, a tensile elongation at break of 200% to 2000%, and a tear strength of 80 mN to 3000 mN. The material of the elastic sheet, however, is not particularly limited as long as the pipette tip and the elastic sheet can be brought into close contact with each other. Exemplary materials of elastic sheets other than polyurethane include low density polyethylene (LDPE), linear low density polyethylene (LLDPE), medium density polyethylene (MDPE), nylon, non-stretched polypropylene (CPP), ethylene-vinyl alcohol copolymer (EVOH), silicone, polyvinyl alcohol (PVA) and polyvinyl chloride (PVC). The thickness of the elastic sheet is 100 μm. Note that, the thickness of the elastic sheet is also not particularly limited as long as desired elasticity can be obtained, and may be set appropriately in accordance with the material of the elastic sheet.

In addition, while the pipette tip insertion portion 3101 is hermetically sealed by the insertion hole hermetic seal 3111, the term "hermetically sealed" does not mean that the pipette tip insertion portion 3101 is completely sealed due to the application of the insertion hole hermetic seal 3111. For example, the insertion hole hermetic seal 3111 may be formed by providing a fine through hole to allow penetration of the pipette tip beforehand such that the through hole is closed by insertion of the pipette tip to bring the pipette tip insertion portion 3101 into a hermetically sealed state. In that case, the through hole includes a first through hole formed in the elastic sheet and a second through hole formed in the adhesive sheet. The size of the first through hole is formed to allow the pipette tip insertion portion 3101 to be hermetically sealed by insertion of the pipette tip. For example, in the present embodiment, the insertion hole hermetic seal 3111 has an initial hole having an outer diameter of 1.2 mm. The second through hole is formed at a position corresponding to the first through hole on the adhesive sheet. At this time, the diameter of the second through hole is preferably longer than the outer diameter D1 at the position of the insertion hole hermetic seal of the pipette tip when arranged at the sealed position h2. This suppresses contact of the pipette tip with the adhesive sheet.

An antigen capture membrane 3300 to be a reaction field is immobilized inside the microchannel 3100. During the progress of the biochemical reaction, liquids such as a liquid sample, a fluorescent labeling liquid or a washing liquid are sequentially supplied to the microchannel 3100 by the pump unit 2500 and brought into contact with the antigen capture membrane 3300.

A bottom surface of the analysis chip 3000 includes a conductor film 3200 and a prism 3400 provided for generating surface plasmon resonance. The conductor film 3200 is a thin film formed of gold. Alternatively, the conductor film 3200 may be formed of a metal such as silver, copper, aluminum, or an alloy containing these metals. The prism 3400 is a dielectric medium formed of a material transparent to the excitation light 9000.

(Reagent Chip)

Figure 3:
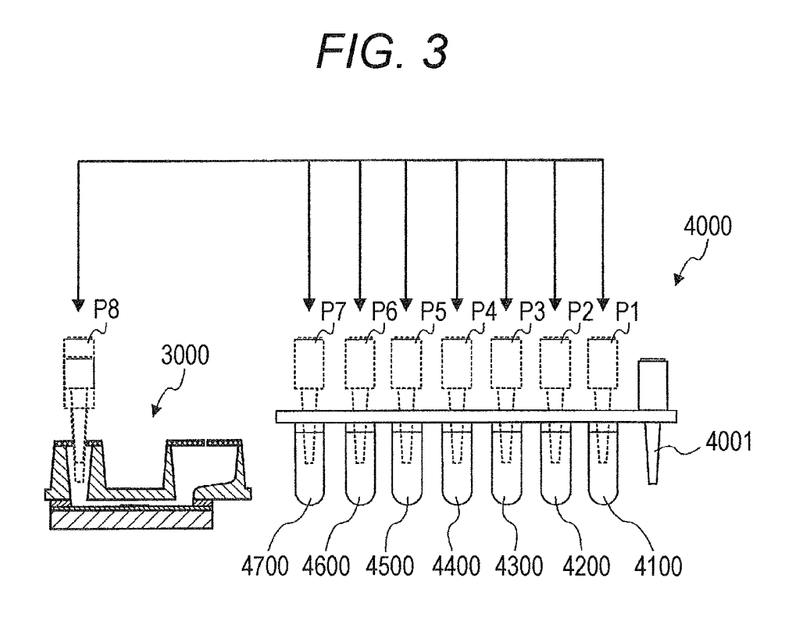
FIG. 3 is an explanatory view for illustrating a reagent chip.

FIG. 3 is an explanatory diagram for illustrating the reagent chip 4000.

As illustrated in FIG. 3, the reagent chip 4000 includes a washing liquid container 4100, a specimen container 4200, a dilution container 4300, a liquid sample container 4400, a fluorescent labeling liquid container 4500, a measurement liquid container 4600, and a waste liquid container 4700.

The liquid containers 4100 to 4700 respectively contain a washing liquid, a specimen, a dilution, a liquid sample, a fluorescent labeling liquid, a measurement liquid, and a waste liquid. In advancing the biochemical reaction, the liquids are supplied from the respective liquid containers 4100 to 4600 to the microchannel 3100 of the analysis chip 3000 by the pump unit 2500. Moreover, the spent liquid collected from the microchannel 3100 is stored in the waste liquid container 4700. On the surface of the reagent chip 4000 in which the openings of the individual liquid containers 4100 to 4600 are formed, an encapsulating seal (not illustrated) is attached so as to cover the openings of the washing liquid container 4100, the dilution container 4300, the liquid sample container 4400, the fluorescent labeling liquid container 4500, the measurement liquid container 4600, and the waste liquid container 4700. Note that it is possible to perform measurement even in a state where the encapsulating seal is not attached.

When a liquid is supplied to the microchannel 3100, the pump unit 2500 moves the pipette tip 4001 to a predetermined position (any of positions P1 to P6) under the control of the control arithmetic unit 5000 to be lowered into a predetermined liquid container and aspirates the predetermined liquid. For example, in the case of supplying the liquid sample to the microchannel 3100, the pump unit 2500 moves the pipette tip to a position P4 above the liquid sample container 4400, lowers the pipette tip so as to be immersed in the liquid sample to aspirate the liquid sample. Next, after aspirating a predetermined amount of liquid, the pump unit 2500 raises the pipette tip 4001, moves the pipette tip 4001 to a position P8 above the pipette tip insertion portion 3101 of the analysis chip 3000, and inserts the pipette tip 4001 into the pipette tip insertion portion 3101. The insertion depth of the pipette tip 4001 into the pipette tip insertion portion 3101 at the time of liquid delivery is adjusted under the control of the control arithmetic unit 5000. The details of the procedure will be described below.

In a case of collecting the liquid from the microchannel 3100, the pump unit 2500 first aspirates the liquid inside the channel. After most of the liquid inside the channel is aspirated, the pump unit 2500 raises the pipette tip 4001 to move to a position P7 above the waste liquid container 4700 of the reagent chip 4000 under the control of the control arithmetic unit 5000. Next, the pump unit 2500 lowers the pipette tip 4001 into the waste liquid container 4700 and dispenses all of the aspirated liquid.

(Control Arithmetic Unit)

Figure 4:
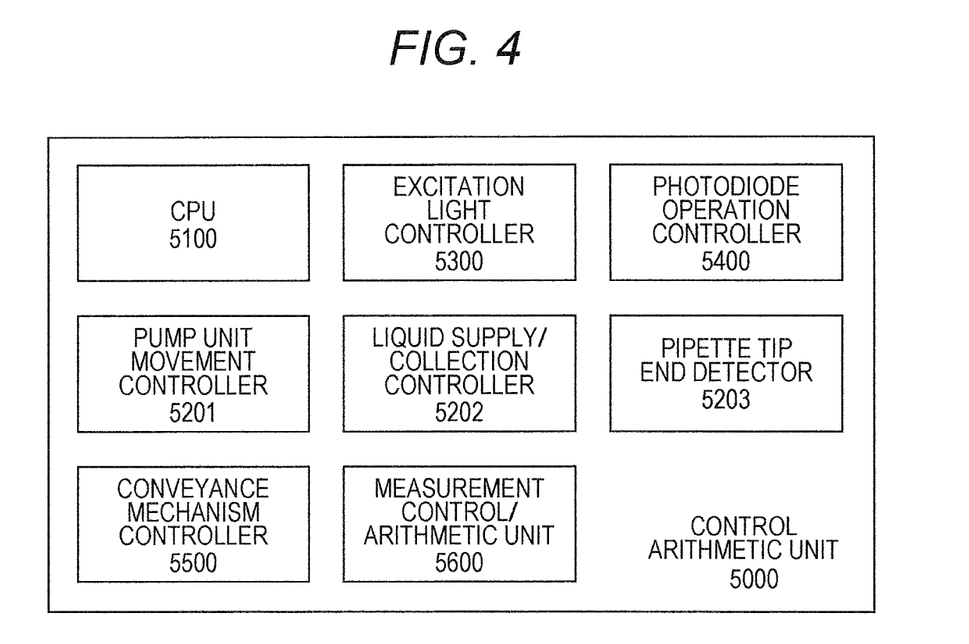
FIG. 4 is a block diagram of a control arithmetic unit.

FIG. 4 is a block diagram of the control arithmetic unit.

As illustrated in FIG. 4, the control arithmetic unit 5000 includes a CPU 5100, an excitation light controller 5300, a photodiode operation controller 5400, a conveyance mechanism controller 5500, a pump unit movement controller 5201, a liquid supply/collection controller 5202, a pipette tip end detector 5203, and a measurement control/arithmetic unit 5600.

The CPU controls the entire biochemical test. The excitation light controller 5300 controls emission of excitation light. The photodiode operation controller 5400 controls operation of the photodiode 2200. The conveyance mechanism controller 5500 controls the conveyance mechanism 2400 so as to convey the analysis chip 3000 between a reaction position B and a measurement position A described below.

The pump unit movement controller 5201 determines the position and the height of the pipette tip and controls the moving mechanism of the pump unit 2500 so as to move the pipette tip to the predetermined position and height. The liquid supply/collection controller 5202 determines the operation of dispensation or aspiration of a liquid, and controls the liquid delivery mechanism of the pump unit 2500 so as to dispense or aspirate a predetermined amount of liquid. The pipette tip end detector 5203 detects the end of the pipette tip as described below. The measurement control/arithmetic unit 5600 performs control related to measurement, such as measurement of the light amount of surface plasmon excitation fluorescence.

(Outline of Biochemical Test)

Figure 5:
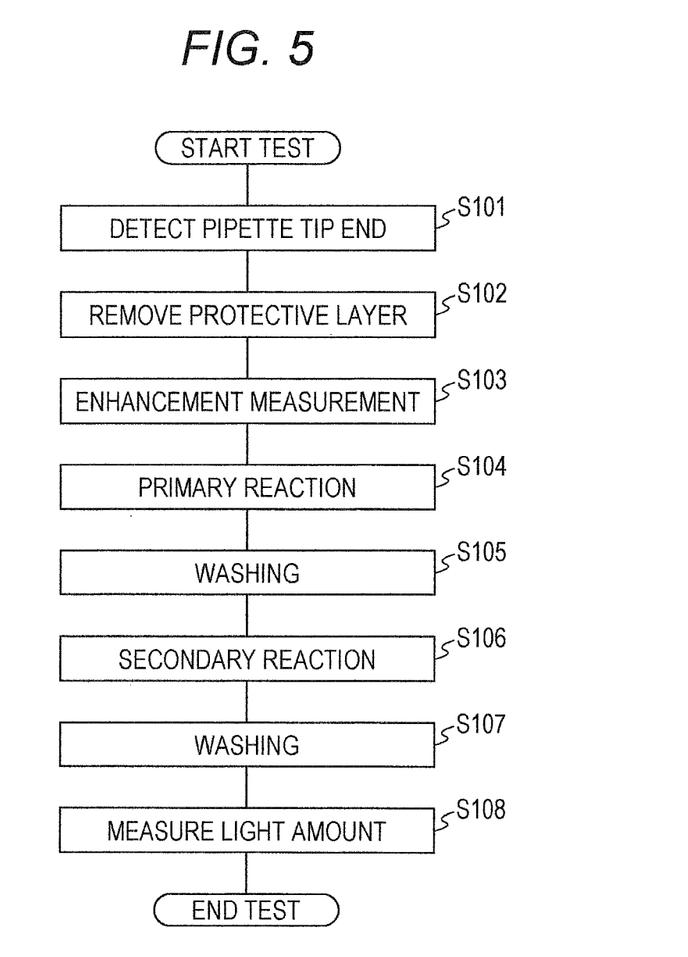
FIG. 5 is a flowchart illustrating a procedure of a biochemical test.

The biochemical test is a test method of capturing a target antigen as a detection target by a biochemical reaction, attaching a fluorescent label to the captured target antigen, and determining the presence or absence of the detection target, a captured amount, or the like, on the basis of the light amount of fluorescence from the attached fluorescent label. FIG. 5 is a flowchart illustrating a procedure of a biochemical test. Hereinafter, a procedure of a biochemical test will be described with reference to FIG. 5.

At a start of the test, detection of the end of the pipette tip is performed (step S101). In the detection of the end of the pipette tip, the pipette tip is attached to the pump unit 2500 under the control of the control arithmetic unit 5000. After the pipette tip is attached to the pump unit 2500, the pipette tip is moved to the position P8 above the pipette tip insertion portion 3101 of the analysis chip 3000, lowered, and penetrates the insertion hole hermetic seal 3111 and is inserted into the pipette tip insertion portion 3101. Next, the pump unit 2500 lowers the pipette tip while dispensing the air, and brings the pipette tip close to the surface of the conductor film (gold film) 3200 being the bottom surface of the pipette tip insertion portion 3101. At the same time, the pressure sensor of the pump unit 2500 detects the air pressure in the pipette tip. The air pressure in the pipette tip increases as the liquid dispensation port of the pipette tip approaches the conductor film 3200. The pipette tip end detector 5203 of the control arithmetic unit 5000 compares a registered value of the air pressure in the pipette tip in the vicinity of the conductor film surface registered beforehand with the measured value of an air pressure within the pipette tip detected by the pressure sensor of the pump unit 2500. When the measured value detected by the pressure sensor starts to become equal to or higher than the registered value registered beforehand, the pipette tip end detector 5203 stores a vertical position of the liquid dispensation port of the pipette tip at that time as the end detection position h0, and then stops the descent of the pipette tip. At that time, the liquid dispensation port of the pipette tip is positioned on the surface or in the vicinity of the conductor film 3200. In addition, the outer diameter of the pipette tip at that time at the position of the insertion hole hermetic seal is defined as a diameter D0 (refer to FIG. 6A).

Next, the measurement liquid is supplied to the microchannel 3100 (step S102). At this time, the analysis chip 3000 is arranged at the reaction position B. The measurement liquid also serves as a washing liquid. As described above, the antigen capture membrane 3300 to be a reaction field to which the solid phase antibody is immobilized is fixed in the microchannel 3100. The antigen capture membrane 3300 has coating of a protective layer provided to maintain a solid phase antibody capture capability for a long period. Therefore, after the measurement liquid is supplied to the microchannel 3100, the measurement liquid is caused to reciprocate within the channel to remove the protective layer. The washing described above may be performed by using a dedicated washing liquid instead of the measurement liquid. In a case where the microchannel 3100 and the antigen capture membrane 3300 are clean and the preservation protective layer or the like is not coated on the antigen capture membrane 3300, there is no need to perform washing.

After the removal the protective layer, succeeding enhancement measurement is performed while the microchannel 3100 is filled with the measurement liquid without the measurement liquid being collected (step S103). At this time, the analysis chip 3000 is arranged at the measurement position A on the measurement optical path, the enhancement angle θr that maximizes the light amount of the scattered light 9300 or the angle of the resonance angle that minimizes the light amount of the reflected light 9400 is detected as the incident angle θ of the excitation light. After the enhancement measurement is finished, the measurement liquid is collected from the microchannel 3100 by aspiration by the pump unit 2500 so as to be stored in the waste liquid container 4700 of the reagent chip 4000.

Next step to perform is a primary reaction to bind the target antigen with the solid phase antibody (step S104). At this time, the analysis chip 3000 is arranged at the reaction position B, and the liquid sample is supplied to the microchannel 3100. The liquid sample is obtained by diluting the specimen collected directly from an examinee with dilution. When the microchannel 3100 is filled with the liquid sample, the liquid sample comes in contact with the antigen capture membrane 3300, and the target antigen contained in the liquid sample binds to the solid phase antibody immobilized on the antigen capture membrane 3300 and is then captured. After the lapse of a sufficient time for the reaction, the liquid sample is collected from the microchannel 3100 to be stored in the waste liquid container 4700 of the reagent chip 4000.

Next, the inside of the flow channel is washed (step S105). In order to remove nonspecifically adsorbed target antigens, a washing liquid is supplied to the microchannel 3100 and is reciprocated to wash the microchannel 3100. After completion of washing, the washing liquid is collected from the microchannel 3100 to be stored in the waste liquid container 4700 of the reagent chip 4000.

Next, a secondary reaction for fluorescent labeling is performed (step S106). In this case, the fluorescent labeling liquid is supplied to the microchannel 3100. When the microchannel 3100 is filled with the fluorescent labeling liquid, the fluorescent labeling liquid and the antigen capture membrane 3300 come into contact with each other, and the fluorescent labeling antibody contained in the fluorescent labeling liquid binds to the captured target antigen, so as to attach a fluorescent label to the captured target antigen. After the lapse of a sufficient time for the reaction, the fluorescent labeling liquid is collected from the microchannel 3100 to be stored in the waste liquid container 4700 of the reagent chip 4000. Thereafter, the washing liquid is supplied into the microchannel 3100, and the inside of the channel is washed (step S107) similarly to step S104.

Finally, in order to determine the presence or absence of binding or the amount of binding of the target antigen to the solid phase antibody, the intensity of the fluorescent label attached to the target antigen, that is, the light amount of fluorescence is measured (step S108). At this time, with the analysis chip 3000 being arranged at the measurement position A, the excitation light 9000 from the excitation light optical system 2100 is emitted to the reflection surface 3123 of the analysis chip 3000. The excitation light 9000 is reflected by the reflection surface 3123, and at the time of reflection, an evanescent wave leaks from the reflection surface 3123 to the conductor film 3200 side. The electric field of the leaking evanescent wave resonates with the surface plasmon of the conductor film 3200 and is enhanced. The enhanced electric field excites the fluorescent label attached to the target antigen captured by the antigen capture membrane 3300. From the excited fluorescent label, surface plasmon excitation fluorescence 9200 is emitted. The measurement unit 2300 measures the light amount of the surface plasmon excitation fluorescence 9200 and determines the presence or absence or the amount of binding of the target antigen.

(Operation of Pipette Tip to Ensure Sealability)

Figure 7A:
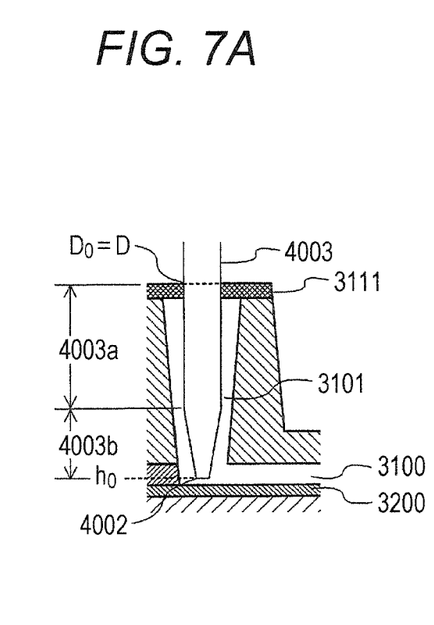
FIGS. 7A to 7C are explanatory diagrams for illustrating operation of a cylindrical end-type pipette tip.
Figure 7B:
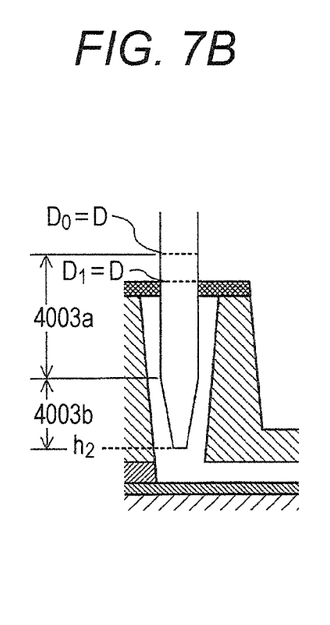
Figure 7C:
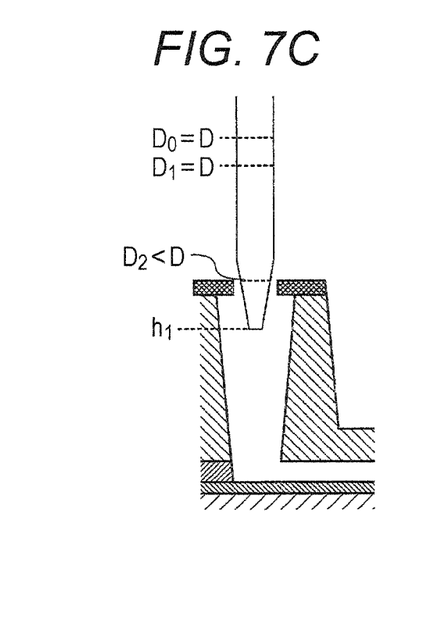

FIGS. 7A to 7C are explanatory diagrams for illustrating operation of the cylindrical end-type pipette tip 4003 (hereinafter also simply referred to as a pipette tip). Hereinafter, the operation of the pipette tip 4003 will be described with reference to FIGS. 7A to 7C.

While the pipette tip 4003 is formed of polypropylene (PP), the material is not particularly limited. Note that it is preferable that the pipette tip 4003 is formed of a material having water repellency, chemical resistance, or inhibiting effect on protein adsorption. Exemplary materials of pipette tips other than polypropylene include polystyrene (PS), polyethylene (PE), low density polyethylene (LDPE), and fluororesin (PFA).

The pipette tip 4003 includes, at an end portion to be inserted into the pipette tip insertion portion 3101 at liquid delivery, a cylindrical intermediate portion 4003a having an equal outer diameter and a conical dispensation portion 4003b positioned closer to the liquid dispensation port side than the intermediate portion 4003a. The outer diameter of the cylindrical intermediate portion 4003a having an equal outer diameter is 2.6 mm. From the viewpoint of ensuring the rigidity of the pipette tip, it is preferable that the pipette tip 4003 is formed to have the outer diameter of the liquid dispensation port 4002 of 0.9 mm or more.

During the pipette tip end detection performed in the above-described step S101, the pipette tip is inserted up to the end detection position h0 as illustrated in FIG. 7A. With this operation, the diameter of the hole of the insertion hole hermetic seal 3111 penetrating through the pipette tip is increased to the outer diameter D0 of the pipette tip at the position of the insertion hole hermetic seal at that time. While the liquid is delivered using a multi-stage liquid delivery method to be described below in individual succeeding steps, the liquid dispensation port of the pipette tip 4003 is arranged at the sealed position h2 when a liquid is supplied to the microchannel, as illustrated in FIG. 7B. With a configuration in which the cylindrical end-type pipette tip as illustrated has the cylindrical intermediate portion 4003a having an equal outer diameter, both the outer diameter D0 of the pipette tip at the position of the insertion hole hermetic seal when the pipette tip is arranged at the end detection position and the outer diameter D1 of the pipette tip at the insertion hole hermetic seal when the pipette tip is arranged at the sealed position are equal to the diameter D of the cylinder. With this configuration, even when the hole of the insertion hole hermetic seal is increased to the diameter D0 by end detection of the pipette tip, it is possible to close the hole of the insertion hole hermetic seal with the outer diameter D1 at the position of the insertion hole hermetic seal of the pipette tip when arranged at the sealed position, enabling dispensation of the liquids with ensured sealability.

Note that the outer diameter D0 of the pipette tip at the position of the insertion hole hermetic seal when arranged at the end detection position need not be exactly the same as the outer diameter D1 of the pipette tip at the position of the insertion hole hermetic seal when arranged at the sealed position. Even when the diameter D0 and the diameter D1 are slightly different, the sealability at the time of liquid delivery can be achieved as long as the hole of the insertion hole hermetic seal that has been increased to the diameter D0 can be closed with the outer diameter D1.

In addition, the intermediate portion 4003a of the cylindrical end-type pipette tip need not be cylindrical. This is because the hole of the insertion hole hermetic seal that has been increased to the diameter D0 can be closed by the outer diameter D1 as long as the outer diameter D1 at the insertion hole hermetic seal position when arranged at the sealed position is formed to be equal to or larger than the outer diameter D0 at the insertion hole hermetic seal position when arranged at the end detection position and the outer diameter of any portion between the outer diameter D1 and the outer diameter D0.

In addition, in a case where a through hole through which the pipette tip penetrates is provided in the insertion hole hermetic seal 3111 beforehand, the through hole is formed to be smaller than the outer diameter D1 of the pipette tip at the insertion hole hermetic seal when arranged at the sealed position in order to ensure the sealability at the time of liquid delivery as described above.

When an encapsulating seal is attached to the surface of the reagent chip 4000, the pipette tip 4003 penetrates through the encapsulating seal to be inserted into the washing liquid container 4100, the dilution container 4300, the liquid sample container 4400, the fluorescent labeling liquid container 4500, the measurement liquid container 4600, or the waste liquid container 4700. At that time, a hole through which the pipette tip 4003 has penetrated is opened in the encapsulating seal. When the hole through which the pipette tip 4003 has penetrated is widely opened in the encapsulating seal, the liquid contained in each of the liquid containers 4100, and 4300 to 4700 might spill. In order to prevent the liquid from spilling from each of the liquid containers 4100, and 4300 to 4700, the pipette tip 4003 preferably has an outer diameter of 3 mm or less from any of portions coming in contact with the encapsulating seal when the liquid dispensation port 4002 is inserted up to the bottom surface of each of the liquid containers 4100 and 4300 to 4700 to the liquid dispensation port 4002.

(Multi-Stage Liquid Delivery Method)

Figure 9A:
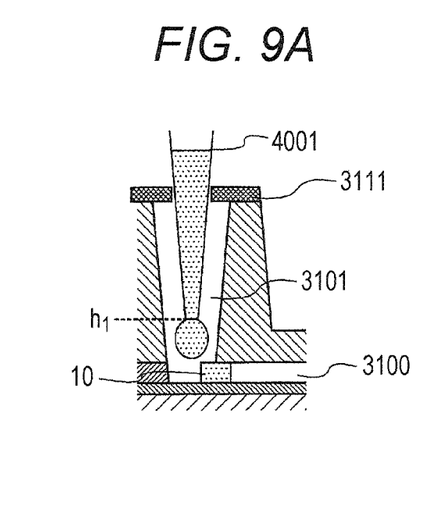
FIGS. 9A to 9C are explanatory diagrams for illustrating a multi-stage liquid delivery method.
Figure 9B:
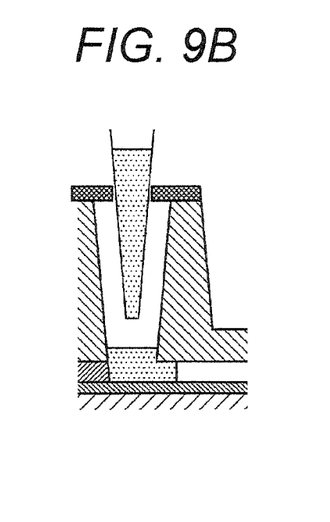
Figure 9C:
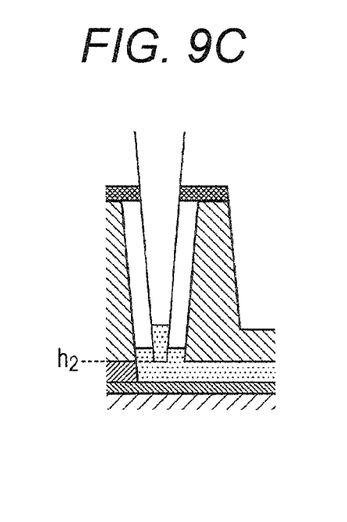

In the above-described biochemical test procedure, particularly in the primary reaction in step S104, the secondary reaction in step S106, and the light amount measurement in step S108, bubbles attached to the antigen capture membrane 3300 might hinder the progress of individual steps, specifically, by suppressing the reaction or by scattering of the excitation fluorescence, leading to a failure in performing precise measurement. FIGS. 9A to 9C are explanatory diagrams for illustrating a multi-stage liquid delivery method. As will be described below, it is possible to suppress the occurrence of bubbles as described above by this multi-stage liquid delivery method, enabling precise and stable measurement without inhibiting reaction or the like by bubbles.

As illustrated in FIG. 9A, at the time of liquid delivery, the pipette tip 4001 is first inserted into a comparatively shallow ventilation position h1 so as not to seal the pipette tip insertion portion 3101. This configuration ensures an air escape between the pipette tip 4001 and the insertion hole hermetic seal 3111. Next, a first amount of liquid is dispensed at this ventilation position h1. In this state, since the air escape is ensured in this state, dispensation of the liquid would apply no pressure to the inside of the pipette tip insertion portion 3101, and thus, the residual liquid 10 in the preceding step is not pushed out toward the downstream side of the microchannel 3100. Furthermore, as illustrated in FIG. 9B, the dispensed first amount of liquid and the residual liquid 10 of the preceding step are integrated, and bubbles are not sandwiched between the dispensed first amount of liquid and the residual liquid 10 of the preceding step, and thus, the generation of bubbles is eliminated.

Next, as illustrated in FIG. 9C, the pipette tip 4001 is inserted into a sealed position h2 deeper than the ventilation position h1 so as to be in close contact with the insertion hole hermetic seal 3111, and a second amount of liquid is dispensed. In this state, since the pipette tip 4001 is brought into close contact with the insertion hole hermetic seal 3111, the pipette tip insertion portion 3101 is hermetically sealed and the air escape path is eliminated. Therefore, when a liquid is dispensed, pressure is applied to the inside of the flow path, enabling the liquid to be supplied to the microchannel 3100.

(Operation of Pipette Tip to Ensure Air Permeability)

In the present embodiment, as described below, by further performing the operation according to the above-described multi-stage liquid delivery method, it is possible to obtain a further effect of suppressing generation of bubbles and ensure reliable liquid delivery into the microchannel. This makes it possible to achieve accurate and stable measurements without inhibiting the progress of biochemical reactions or generation of surface plasmon excitation fluorescence by bubbles.

Before pipette tip insertion portion 3101 is hermetically sealed to deliver the liquid in the multi-stage liquid delivery method described above, a portion of the liquid is dispensed at the ventilation position h1 where an air escape path is ensured. In this case, by further providing the conical dispensation portion 4003b on the side closer to the liquid dispensation port side than the cylindrical intermediate portion 4003a having an equal outer diameter, the outer diameter D2 of the cylindrical end-type pipette tip at the insertion hole hermetic seal position when arranged at the ventilation position h1 is smaller than the diameter D of the cylinder as illustrated in FIG. 7C. Accordingly, it is also possible to ensure the air permeability of the pipette tip insertion portion 3101. This ensures an air escape path to enable the liquid to be dispensed without pushing out the residual liquid 10 of the preceding step, leading to achievement of liquid delivery without generation of bubbles.

In a case where a through hole through which the pipette tip penetrates is provided in the insertion hole hermetic seal 3111 beforehand, it is preferable that the through hole is formed to be larger than the outer diameter D2 of the pipette tip at the insertion hole hermetic seal position when arranged at the ventilation position in order to ensure the air permeability at the time of liquid delivery as described above. In a case, however, where the diameter of the through hole is increased to be larger than the outer diameter D2 by end detection of the pipette tip described above, the through hole may be formed to have a diameter smaller than the outer diameter D2.

In addition, due to the insertion of the pipette tip up to the end detection position h0 or the sealed position h2, the insertion hole hermetic seal 3111 extends to the inside of the pipette tip insertion portion 3101 to form an extending portion. In this case, it is possible to prevent interference of the extending portion with liquid dispensation from the liquid dispensation port 4002 by arranging the liquid dispensation port 4002 of the pipette tip 4003 to be positioned below the extending portion.

Note that it is allowable to form the cylindrical end-type-end pipette tip to include the outer diameter D2 at the position of the insertion hole hermetic seal when arranged at the ventilation position, the size being equal to or smaller than the outer diameter D1 at the insertion hole hermetic seal position when arranged at the sealed position, in at least one position in the intermediate portion 4003a, and there is no need to provide the conical dispensation portion 4003b on the side closer to the liquid dispensation port than the intermediate portion 4003a. For example, it is allowable to provide a recess having the outer diameter D2 in the cylindrical intermediate portion 4003a without providing the conical dispensation portion 4003b.

Moreover, with the dispensation portion 4003b having a simple conical shape, a travel distance of the pipette tip from the ventilation position h1 to the sealed position h2 might be prolonged. To cope with this, the dispensation portion 4003b may be shaped in a substantially funnel shape including a first truncated cone having the outer diameter decreasing at a constant first decrease rate toward the liquid dispensation port direction and a second truncated cone having the outer diameter changing at a second decrease rate smaller than the first decrease rate or not changing (that is, when the second decrease rate is zero), the second truncated cone being formed continuously from the first truncated cone (the shape is cylindrical when the second decrease rate is zero). With this configuration, the travel distance of the pipette tip from the ventilation position h1 to the sealed position h2 can be reduced.

In addition, in a case where the formation of bubbles does not occur or the influence of the bubbles can be ignored, there is no need to deliver liquid using the multi-stage liquid delivery method. In this case, there is no need to provide the conical dispensation portion 4003b having the outer diameter D2 smaller than the cylindrical intermediate portion 4003a.

As described above, the cylindrical end-type pipette tip provided in the present test kit has the cylindrical intermediate portion 4003a having an equal outer diameter at the end portion thereof, in which the outer diameter at the insertion hole hermetic seal position when arranged at the end detection position matches the outer diameter at the insertion hole hermetic seal position when arranged at the sealed position. Accordingly, even when the hole of the insertion hole hermetic seal is increased by end detection of the pipette tip, there is no loss of sealability at the time of liquid delivery. In addition, by further providing the conical dispensation portion 4003b having an outer diameter smaller than the outer diameter at the insertion hole hermetic seal position when arranged at the sealed position on the side closer to the liquid dispensation port side than the intermediate portion 4003a, it is possible to ensure air permeability in execution of liquid delivery using the multi-stage liquid delivery method, leading to achievement of liquid delivery without bubble generation.

This application claims priority based on Japanese Patent Application No. 2015-224215 filed on Nov. 16, 2015. The contents described in the application specification and the drawings are all incorporated herein by reference.

REFERENCE SIGNS LIST

10 Residual liquid
20 Bubble
1000 Biochemical testing apparatus
2100 Excitation light optical system
2200 Photodiode
2300 Measurement unit
2400 Conveyance mechanism 2500 Pump unit
3000 Analysis chip
3100 Microchannel
3101 Pipette tip insertion portion
3102 Stirring tank
3111 Insertion hole hermetic seal
3112 Stirring tank seal
3113 Vent
3123 Reflection surface
3200 Conductor film
3300 Antigen capture membrane
3400 Prism
4000 Reagent chip
4001 Pipette tip
4002 Liquid dispensation port
4003 Cylindrical end-type pipette tip
4003a Intermediate portion
4003b Dispensation portion
4100 Washing liquid container
4200 Specimen container
4300 Dilution container
4400 Liquid sample container
4500 Fluorescent labeling liquid container
4600 Measurement liquid container
4700 Waste liquid container
5000 Control arithmetic unit
5100 CPU
5201 Pump unit movement controller
5202 Liquid supply/collection controller
5203 Pipette tip end detector
5300 Excitation light controller
5400 Photodiode operation controller
5500 Conveyance mechanism controller
5600 Measurement control/arithmetic unit
9000 Excitation light
9200 Surface plasmon excitation fluorescence
9300 Scattered light
9400 Reflected light

The invention claimed is:

1. A test kit comprising an analysis chip and a pipette tip,
wherein the analysis chip includes a pipette tip insertion portion hermetically sealable by a seal and includes a microchannel connected at a bottom surface of the pipette tip insertion portion,
an end portion of the pipette tip to be inserted into the pipette tip insertion portion includes: a first portion coming in contact with the seal when being inserted into the pipette tip insertion portion so as to allow a liquid dispensation port to be positioned at or in the vicinity of the bottom surface of the pipette tip insertion portion; and a second portion positioned closer to the liquid dispensation port side than the first portion, and
an outer diameter of the second portion is formed to be larger than an outer diameter of the first portion and any portion between the first portion and the second portion, the second portion having a cylindrical shape over at least a portion of its lengthwise extent that does not include the pipette tip,
wherein the end portion of the pipette tip to be inserted into the pipette tip insertion portion further includes a third portion having an outer diameter smaller than the outer diameter of the first portion,
wherein a through hole is formed in the seal beforehand, the through hole having a diameter smaller than an outer diameter of the cylindrical portion of the second portion of the end portion of the pipette tip to be inserted into the pipette tip insertion portion, the through hole having a diameter larger than the third portion of the pipette tip.

2. The test kit according to claim 1,
wherein the end portion of the pipette tip to be inserted into the pipette tip insertion portion is formed at least in part in a cylindrical shape with a portion from the first portion to the second portion having an equal outer diameter, and
the third portion is positioned closer to the liquid dispensation port side than the second portion.

3. The test kit according to claim 2,
wherein, in the end portion of the pipette tip to be inserted into the pipette tip insertion portion, a portion closer to the liquid dispensation port side than the second portion includes:
a first truncated cone having an outer diameter decreasing at a constant first decrease rate toward the liquid dispensation port; and
a second truncated cone or a second cylindrical portion, having an outer diameter changing at a second decrease rate smaller than the first decrease rate or not changing at all, the second truncated cone or the second cylindrical portion being formed continuously from the first truncated cone, and
the third portion is positioned at the second truncated cone.

4. The test kit according to claim 1,
wherein the liquid dispensation port of the pipette tip is formed to have an outer diameter of 0.9 mm or more.

5. A liquid delivery method using a test kit including:
an analysis chip having a pipette tip insertion portion hermetically sealable by a seal and having a microchannel connected at a bottom surface of the pipette tip insertion portion; and
a pipette tip to be inserted into the pipette tip insertion portion to dispense a liquid, the pipette tip having a first portion coming in contact with the seal when the pipette tip is inserted into the pipette tip insertion portion to allow a liquid dispensation port of the pipette tip to be positioned at or in the vicinity of the bottom surface of the pipette tip insertion portion, and a second portion positioned closer to the liquid dispensation port side than the first portion,
wherein an outer diameter of the second portion is formed to be larger than an outer diameter of the first portion and any portion between the first portion and the second portion, the second portion having a cylindrical shape over at least a portion of its lengthwise extent that does not include the pipette tip, wherein the end portion of the pipette tip to be inserted into the pipette tip insertion portion further includes a third portion having an outer diameter smaller than the outer diameter of the first portion, wherein a through hole is formed beforehand in the seal, the through hole having a diameter smaller than an outer diameter of the cylindrical portion of the second portion of the end portion of the pipette tip to be inserted into the pipette tip insertion portion, the through hole having a diameter larger than the third portion of the pipette tip,
the liquid delivery method comprising:
inserting the pipette tip into the pipette tip insertion portion so as to allow the liquid dispensation port of the pipette tip to be positioned at or in the vicinity of the bottom surface of the pipette tip insertion portion; and
arranging the second portion of the pipette tip so as to be in close contact with the seal after the inserting and dispensing a liquid into the pipette tip insertion portion to supply the liquid into the microchannel.

6. A liquid delivery method using a test kit including:

an analysis chip having a pipette tip insertion portion hermetically sealable by a seal and having a microchannel connected at a bottom surface of the pipette tip insertion portion; and a pipette tip to be inserted into the pipette tip insertion portion and to dispense a liquid, the pipette tip having a first portion coming in contact with the seal when the pipette tip is inserted into the pipette tip insertion portion to allow a liquid dispensation port of the pipette tip to be positioned at or in the vicinity of the bottom surface of the pipette tip insertion portion, a second portion positioned closer to the liquid dispensation port side than the first portion, and a third portion having an outer diameter smaller than an outer diameter of the first portion, wherein an outer diameter of the second portion is formed to be larger than the outer diameter of the first portion and any portion between the first portion and the second portion, the second portion having a cylindrical shape over at least a portion of its lengthwise extent that does not include the pipette tip, wherein the end portion of the pipette tip to be inserted into the pipette tip insertion portion further includes a third portion having an outer diameter smaller than the outer diameter of the first portion, wherein a through hole is formed beforehand in the seal, the through hole having a diameter smaller than an outer diameter of the cylindrical portion of the second portion of the end portion of the pipette tip to be inserted into the pipette tip insertion portion, the through hole having a diameter larger than the third portion of the pipette tip, the liquid delivery method comprising:

supplying a first liquid into the microchannel;

collecting the first liquid supplied into the microchannel from inside the microchannel;

dispensing a first amount of a second liquid into the pipette tip insertion portion in a state where the third portion of the pipette tip is arranged at a position of the seal; and arranging the second portion of the pipette tip so as to be in close contact with the seal after dispensing the first amount of the second liquid, and then dispensing a second amount of the second liquid into the pipette tip insertion portion to supply the second liquid into the microchannel.

7. A testing apparatus on which a test kit is removably installable, the test kit including:

an analysis chip having a pipette tip insertion portion hermetically sealable by a seal and having a microchannel connected at a bottom surface of the pipette tip insertion portion; and a pipette tip to be inserted into the pipette tip insertion portion to dispense a liquid, the pipette tip having a first portion coming in contact with the seal when the pipette tip is inserted into the pipette tip insertion portion to allow a liquid dispensation port of the pipette tip to be positioned at or in the vicinity of the bottom surface of the pipette tip insertion portion, a second portion positioned closer to the liquid dispensation port side than the first portion, and a third portion having a smaller outer diameter than the first portion, wherein an outer diameter of the second portion is formed to be larger than an outer diameter of the first portion and any portion between the first portion and the second portion, the second portion having a cylindrical shape over at least a portion of its lengthwise extent that does not include the pipette tip, wherein the end portion of the pipette tip to be inserted into the pipette tip insertion portion further includes a third portion having an outer diameter smaller than the outer diameter of the first portion, wherein a through hole is formed beforehand in the seal, the through hole having a diameter smaller than an outer diameter of the cylindrical portion of the second portion of the end portion of the pipette tip to be inserted into the pipette tip insertion portion, the through hole having a diameter larger than the third portion of the pipette tip, the testing apparatus comprising:

a liquid deliverer that supplies a liquid from the pipette tip inserted into the pipette tip insertion portion into the microchannel, the liquid deliverer supplying a first liquid into the microchannel, collecting the first liquid supplied into the microchannel from inside the microchannel and thereafter dispensing a first amount of a second liquid into the pipette tip insertion portion in a state where the third portion of the pipette tip is arranged at a position of the seal, arranging the second portion of the pipette tip so as to be in close contact with the seal after dispensing the first amount of the second liquid, and then dispensing a second amount of the second liquid into the pipette tip insertion portion to supply the second liquid into the microchannel; and a detector that detects a reaction result of a reaction field fixed inside the microchannel.

* * * * *